United States Patent [19]
Robison

[11] Patent Number: 5,710,927
[45] Date of Patent: Jan. 20, 1998

[54] METHOD OF REPLACING LVALUES BY VARIABLES IN PROGRAMS CONTAINING NESTED AGGREGATES IN AN OPTIMIZING COMPILER

[75] Inventor: Arch D. Robison, Champaign, Ill.

[73] Assignee: Kuck & Associates, Inc., Champaign, Ill.

[21] Appl. No.: 490,130

[22] Filed: Jun. 14, 1995

[51] Int. Cl.$^6$ .................................................. G06F 9/00
[52] U.S. Cl. .................................................. 395/709
[58] Field of Search .................................................. 395/709

[56] References Cited

U.S. PATENT DOCUMENTS

| | | | |
|---|---|---|---|
| 5,396,627 | 3/1995 | Iitsuka | 395/708 |
| 5,481,708 | 1/1996 | Kukol | 395/709 |

OTHER PUBLICATIONS

Cytron, Ron, and Lowry, Andy, and Zadeck, Kenneth, "Code Motion of Control Structures in High–Level Languages", Conference Record 13th Annual ACM. Symposium on Principles pf Programming Languages (St. Petersburg, FL, Jan. 13–15, 1986), ACM, New York, pp. 70–85.

Aho, Alfred V. and Sethi, Ravi and Ullman, Jeffrey D., "Compilers, Principles, Techniques, and Tools," Addison–Wesley, 1986 pp. 608–611.

Budge, Kent G. and Perry, James S. and Robinson, Allen C, and Wong, Michael K., "Management of Class Temporaries by C++ Translation Systems" Journal of C Language Translation, Dec. 1994, 6(2).

*Primary Examiner*—Kevin A. Kriess
*Assistant Examiner*—John D. Chavis
*Attorney, Agent, or Firm*—Brinks Hofer Gilson & Lione

[57] ABSTRACT

A method for analyzing and optimizing programs that define and use aggregate data structures. A program to be analyzed and optimized is inspected to find definitions and uses of lvalues, which are regions of memory. The lvalues may be denoted by program variables, pointer expressions, or components of aggregate lvalues. A data-flow solver determines where definitions of lvalues reach uses. A set of "least general unifiers" are computed for the definitions and uses. A replacement variable is created for each least general unifier that is determined to be replaceable. Each reference to an lvalue that corresponds to a replaceable least general unifier is replaced by a reference to the corresponding replacement variable or a component thereof. The method is applicable even in the presence of potential aliasing.

10 Claims, 10 Drawing Sheets

```
/*
 * Declare variable v as pointer to aggregate with components f1 and f2.
 */
struct S1 {
    int f1;              /* f1 is integer */
    struct {
            struct S2 * f3;   /* f3 is pointer to aggregate of type S2 */
            struct S2 * f4;   /* f4 is pointer to aggregate of type S2 */
    } f2;                /* f2 is aggregate with components f3 and f4. */
} * v;

/*
 * Declare type S2 to be aggregate with components f5 and f6
 */
struct S2 {
    int f5;              /* f5 is integer */
    int f6;              /* f6 is integer */
};
```

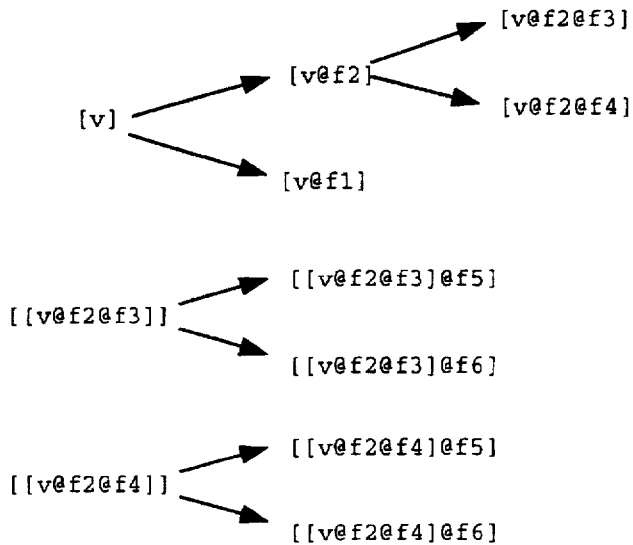

C declaration and corresponding region-forest.

Fig. 1

```
L1:
if( x<y ) {
    int z;
    z = 2*x;
    y = 3*x + z;
} else {
    y = 5*x;
}
x = y/12;
L2:;
```

Example C program and its corresponding flow-graph.

Part 2 of process for computing effect of load of lvalue L on least-general-unifiers of definitions.

Process for computing effect of call C on least-general-unifiers of definitions.

Process MARK-IRREPLACEABLE-IF-LIVE
for a definiton D and flow-graph vertex V.

Process for computing of use U on least-general-unifiers of definitions whose support has collapsed.

Process for creating replacement variables from least-general-unifiers.

Process for replacing reference to lvalue L by replacement variable.

METHOD OF REPLACING LVALUES BY VARIABLES IN PROGRAMS CONTAINING NESTED AGGREGATES IN AN OPTIMIZING COMPILER

REFERENCES

1. Aho, Alfred V. and Sethi, Ravi and Ullman, Jeffrey D., "Compilers, Principles, Techniques, and Tools," Addison-Wesley, 1986.
2. Budge, Kent G. and Perry, James S. and Robinson, Allen C. and Wong, Michael K. "Management of Class Temporaries by C++ Translation Systems", Journal of C Language Translation, December 1994, 6(2).
3. Cytron, Ron, and Lowry, Andy, and Zadeck, Kenneth, "Code Motion of Control Structures in High-Level Languages", Conference Record 13th Annual ACM Symposium on Principles of Programming Languages (St. Petersburg, Fla., Jan. 13–15, 1986), ACM, New York, pp.70–85.

BRIEF DESCRIPTION OF THE DRAWINGS

FIG. 1 shows a C declaration and a corresponding region-tree.

TECHNICAL FIELD

Figure 2:
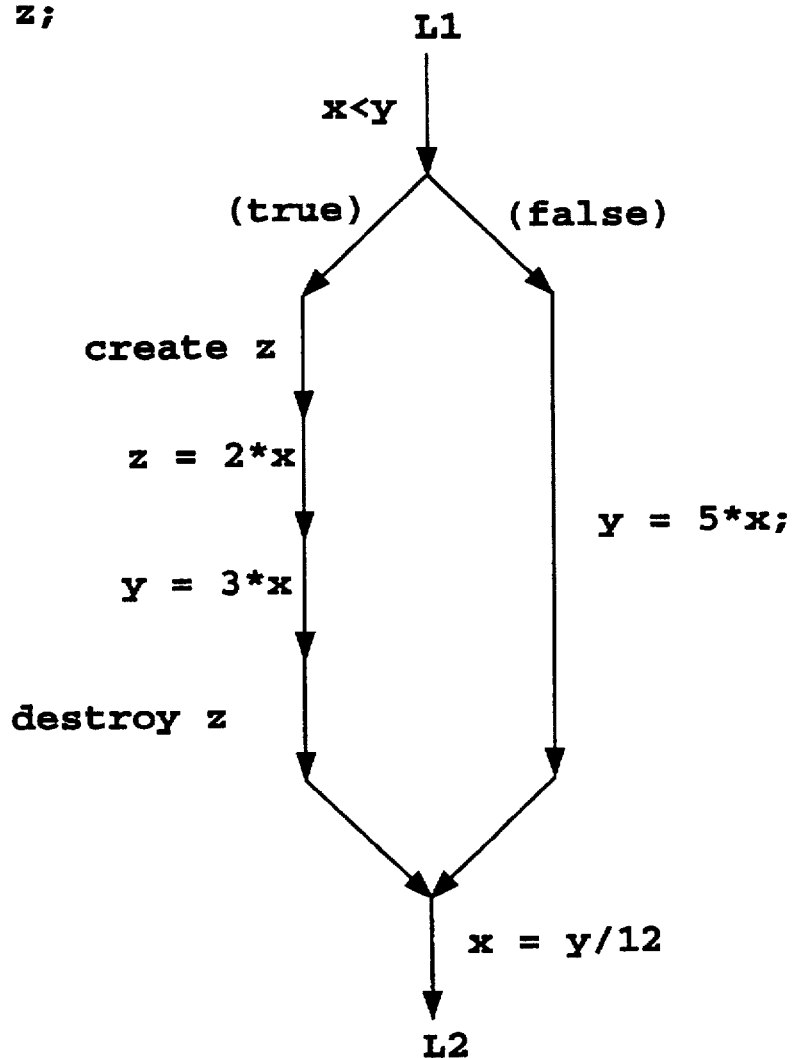
FIG. 2 shows a C program and corresponding flow-graph.

The present invention generally relates to software compiler technology. More particularly, the present invention relates to a method for replacing references to lvalues (regions of memory) by local variables. In particular, the present invention replaces lvalues that are components of aggregates. Replacement of a component by a local variable is generally beneficial because code-generators are more adept at optimizing usages of scalar variables than they are at optimizing components of aggregates.

Early programming languages like FORTRAN had scalar variables and arrays, and consequently optimizers have focused on scalar-replacement of scalars, which is also known as scalar-renaming, and scalar-replacement of array elements.

Newer programming languages such as C++, FORTRAN-90, and Ada have aggregates and pointers for which the early technology for scalar-replacement is inadequate. In fact, limiting replacement to replacement by scalar variables is itself inadequate since there arise situations in which the lvalue to be replaced is itself an aggregate and thus not a scalar.

BACKGROUND OF THE INVENTION

Cytron, Lowry, and Zadeck [3] describe a method for scalar renaming. Their algorithm for scalar renaming is a method inferior to the present invention for scalar-replacement, because it does not consider aggregate variables, or scalars with aliases, or lvalues of any sort that are not variables.

Budge et al. [2] describe an inferior method for replacing structure components with scalars. Their method proceeds in two steps:

1. Rewrite expressions to remove (where possible) "address-taken" operators, and rewrite structure-assignments into multiple assignments.
2. Replace each component of structure S by a scalar variable if the following conditions are met:
   (a) The address of the structure S is not taken.
   (b) The components of the structure are only used in C "dot" expressions. I.e., the components appear only in lexical contexts that use each component separately.

The primary weakness of their method is that it examines lexical references to aggregate components instead of data-flow information for aggregate components. Thus it cannot work on aggregates whose address is taken, aggregates that are not local variables, or aggregates that are unions.

SUMMARY AND OBJECTS OF THE INVENTION

It is the primary object of the present invention to provide within an optimizing compiler a method for replacing references to lvalues by references to variables.

It is a further object of the invention to compute least-general-unifiers from data-flow analysis as opposed to simple lexical analysis.

It is a further object of the invention to represent least-general-unifiers as nodes of trees, and thus allow efficient computation of least-general-unifiers.

It is a further object of the invention to replace references to lvalues by variables corresponding to least-general-unifiers, instead of replacing lvalues by variable corresponding to their smallest components, thus allowing the invention to avoid breaking lvalues up into unnecessarily small variables.

It is a further object of the invention to delete unnecessary stores to lvalues during the process of replacing references to lvalues by variables.

It is a further object of the invention to replace references to lvalues that may have aliases or their address taken.

It is a further object of the invention to replace references to components of aggregates that may overlap, as in "unions" in the programming language C.

It is a further object of the invention to efficiently handle lvalues that are referenced beyond the part of the program being analyzed.

It is a further object of the invention that it does not spend time analyzing a component of a referenced aggregate when the component itself is not referenced individually.

DETAILED DESCRIPTION

An "aggregate" is a group of zero or more regions of memory that may be referenced as a single entity, or by specified components. The regions may overlap, as found for example, in "unions" in the programming languages C and C++. Aggregates may contain aggregates themselves. A "sub-component" of an aggregate is a component of the aggregate or (recursively) a component of a sub-component. Examples of aggregates in the programming languages C and C++ are structs, unions, and arrays. Examples of aggregates in the programming languages Ada and Pascal are records and arrays. Examples of aggregates in the programming language FORTRAN-90 are structures and arrays. The invention applies to similar constructions in other programming languages.

An "rvalue" is a value (bit-pattern). An "rvalued expression" is an expression that, when evaluated, yields an rvalue. An "lvalue" is a region of memory (or register) denoted by a program variable, a designating rvalue, or component of an "aggregate lvalue". An "aggregate lvalue" is a region of memory that can be manipulated as a single entity or manipulated as a collection of components, where each component is an lvalue. Examples of aggregates in the C language are arrays, "structs", and "unions". Distinct components of an aggregate need not correspond to distinct regions of memory, as is the case, for example, for components of a "union" in the C language.

The contents of an lvalue are an rvalue. An "lvalued expression" is an expression, that when evaluated, yields an lvalue. A "designating rvalue" is an rvalue that "points" to an lvalue. Each lvalue has a unique designating rvalue, though many different expressions may evaluate to that rvalue. Some expressions can be both rvalued and lvalued, depending upon context. For example, in the statement

J:=J+1 the J on the left-hand-side denotes an lvalue that is stored into. The J on the right-hand-side denotes an lvalue from which is loaded an rvalue. The designating rvalue of lvalue L is denoted ADDRESS(L).

The following notations are used for descriptive purposes. For an rvalue P that points to an lvalue, the notation [P] denotes the lvalue designated by rvalue P. For an rvalue P that points to an aggregate of a type with a component F, the notation P@F denotes a pointer to the component within the aggregate pointed to by P. The operator @ is left-associative; thus, P@F@G denotes a pointer to component G of component F of the aggregate pointed to by P. Notice that in this case P@F denotes a pointer to a component that is itself an aggregate. The notation [P] corresponds to (*P) in the language C. The notation P@F corresponds to (&(*P).F) in the language C. The notation described in this paragraph is not part of the invention, but merely simplifies discussion of it. In particular, the notation P@F is intended to convey the notion that P@F is a pointer computed by adjusting pointer P, whereas the C notation (&(*P).F) introduces a redundant indirection (*P) that is "canceled" by the C address-taken operator &.

A "definition" is the assignment of a right-hand-side rvalue to a left-hand-side lvalue. The "support" of an rvalued expression E is denoted as SUPPORT(E), and is the set of mutable lvalues that are loaded from when the expression E is evaluated. An lvalue is mutable if it can possibly have more than one value assigned to it during program execution. The "support" of an lvalue is the support of the designating rvalue, or the empty set if the lvalue has no designating rvalue. (E.g., "register variables" in the C language.) For example, consider the definition below.

[[v1@f2@f3]@f5]:=[[v2@f2@f4]@f6]+3.14

1. The left-hand-side lvalue is "[[v1@f2@f3]@f5]".
2. The rvalue designating that lvalue is "[v1@f2@f3]@f5".
3. The right-hand-side rvalue is "[[v2@f2@f4]@f6]+3.14".
4. The support of the left-hand-side lvalue is the set {v1,[v1@f2@f3]}
5. The lvalue [[v1@f2@f3]@f5] is not part of the support, since it is stored into, not loaded from.
6. The support of the right-hand-side rvalue is the set {v2,[v2@f2@f4], [[v2@f2@f4]@f6]}

The support of an rvalue may be empty. For instance, the support for an rvalued expression E is empty if expression E contains no loads from mutable lvalues. For example, the constant "3.14" is an rvalue that contains no loads from mutable lvalues.

The preferred embodiment considers a reference to an lvalue to be a load, store, or a combination thereof (e.g., an increment operator). A load or store is called "separable" if it is the load or store of an aggregate value and can be rewritten as multiple loads or stores of the components of the aggregate.

The preferred embodiment employs a data-structure called a region-forest. A "region-forest" is a set of "region-trees". A "region-tree" is a tree structure that represents an lvalue and its (recursive) decomposition into component lvalues. Each node in a region-tree, called a "region-node", corresponds to an lvalue. A region-forest need not contain representations for all lvalues. For each lvalue L, the corresponding region-node in a region-forest is denoted NODE (L). If an lvalue L is not represented in a region-forest, then NODE(L) yields a special value NULL that is not a node in the forest.

Each region-tree has a "root" node, which has no parent node. Each non-root node has a single parent node. The parent of NODE(L) corresponds to the innermost aggregate that properly contains the lvalue L. In other words, if a region-node NODE(M) corresponds to an aggregate lvalue M, then the children of NODE(M) correspond to the components of lvalue M. The root node of a region-tree has no parent, and corresponds to an lvalue that is not a component of any lvalue. Given an lvalue L, the root node of the region-tree that denotes its outermost containing lvalue is denoted ROOT(L). Notice that for any pointer P with component F, the following is always true: ROOT([P])= ROOT([P@F]). It follows that if a scalar lvalue is not a component of any lvalue, then the corresponding region-tree is always a trivial tree consisting of only a root node.

A node A is an "ancestor" of a node D if a node A is the same node as a node D or (recursively) node A is the parent of an ancestor of node D. Similarly, a node D is a "descendant" of node A if node D is the same node as node A or (recursively) a child of a descendant of node A. Notice that a node is considered to be both an ancestor and descendant of itself. The "nearest common ancestor" of two nodes X and Y, if it exists, is the node that is an ancestor of both X and Y and has no child that is also an ancestor of both X and Y.

A region-forest need not represent all lvalues or components of an lvalue; it can represent only some components of an lvalue if only those components are of interest. For example, if an lvalue [P] has components [P@F] and [P@G], the corresponding region-tree can omit the nodes corresponding to either or both of the components. A point not to be overlooked in a correct embodiment is that since a region-tree need not represent all components of an lvalue, there can be one or more component lvalues L such that ROOT(L) exists but NODE(L) does not. That is, the outermost containing lvalue of a component can be represented as a node in the tree without necessarily representing the component as a node in the tree.

Not representing all lvalues in a region-tree is an essential part of making the preferred embodiment efficient. For example, if a program declares an array A with N elements, but references only the first element, the region-tree need only contain 2 nodes: a node for A and a node for the first element of A. If all elements were represented, it would require N+1 nodes: a node for A and a node for each of the N elements.

The "type" of the region denoted by NODE(L) is denoted TYPE(NODE(L)). For example, if L corresponds to a memory-region that holds a double-precision floating-point value, then TYPE(NODE(L)) is "double-precision floating-point".

FIG. 1 shows a declaration of a variable v in the programming language C and the region-forest that corresponds to the lvalues pointed to by v and [v@f2@f4] and [v@f2@f3]. An essential point of the invention is that the lvalue corresponding to root need not be a pointer variable, but may be designated by an arbitrary expression, as demonstrated in the example by the trees corresponding to the lvalues [v@f2@f3] and [v@f2@f4]. A point to be emphasized is that the tree for the lvalue pointed to by v is distinct from the trees for the lvalues pointed to by [v@f2@f3] and [v@f2@f4]. Each tree represents the decomposition of an lvalue, not an "indirection chain" of pointers. Distinct indirection chains are represented by different trees.

The core of the embodiment is calculation of "least-general-unifiers" (LGUs). The LGU of a set of lvalues is the smallest lvalue that contains those lvalues. The LGU of a set of lvalues is represented in one of two ways:

(a) A pointer to a node in REGION_CANDIDATE_FOREST. This denotes that the LGU is the lvalue corresponding to the node in REGION_CANDIDATE_FOREST.

(b) A special pointer called IRREPLACEABLE. This denotes that the lvalues have no unifier, or that replacement is prohibited for some other reason.

The present invention associates each component c of a definition D with a group of lvalues. The group is denoted GROUP(D.c), and always contains D.c as one of the lvalues. Three attributes are associated with each group G. These are:

(a) An attribute LGU(G) that is the LGU for the definitions in a group G. The value of LGU(G) is a node in REGION_CANDIDATE_FOREST or IRREPLACEABLE.

(b) An attribute IS_LIVE(G) that records whether the definitions in the group G are ever used. The value of IS_LIVE(G) is either TRUE or FALSE.

(c) An attribute REPLACEMENT(G) that records the replacement variable, if any, that is assigned to the group. The value of REPLACEMENT(G) is either a variable or the special value NONE.

The invention employs a function LUB that returns an LGU and is defined as follows:

```
LUB(LGU1,LGU2)
    if LGU1 is IRREPLACEABLE or LGU2 is IRREPLACEABLE then
        return IRREPLACEABLE
    else if nodes pointed to by LGU1 and LGU2 have a common ancestor
        return pointer to nearest common ancestor of the nodes
        pointed to by LGU1 a
    else return IRREPLACEABLE
```

The invention employs a recursive function MAKE_SUBREGION that returns an expression denoting an lvalue. The function MAKE_REGION takes as arguments nodes NODE1 and NODE2 such that NODE2 is identical to a descendant of NODE1 in REGION_CANDIDATE_FOREST, and given lvalue LVALUE1, returns an lvalue that solves the analogy "NODE1 is to NODE2 as LVALUE1 is to _?".

```
MAKE_SUBREGION(NODE1,NODE2,LVALUE1)
    if NODE1==NODE2 then
        return LVALUE1
    else
        return component denoted by NODE2 of lvalue
            MAKE_SUBREGION(NODE1,PARENT(NODE2),
            LVALUE1)
```

The invention employs a binary operation on groups called "UNIFY_GROUP".

```
UNIFY (GROUP1,GROUP2)
    Merge GROUP1 and GROUP2 into new group G.
    Set LGU(G) := LUB( LGU(GROUP1), LGU(GROUP2) )
    if IS_LIVE(GROUP1)=TRUE OR IS_LIVE(GROUP2)
        Set IS_LIVE(G) := TRUE;
    else
        Set IS_LIVE(G) := FALSE;
```

Those skilled in the art will recognize that the merging of groups can be accomplished efficiently by the classical "union-find" algorithms.

The preferred embodiment employs a flow-graph representation of a program in which edges of the graph represent transfer of control, evaluation of expressions, and/or creation/destruction of local variables. Vertices correspond to labels and unlabeled points of execution between statements. This kind of flow-graph departs from common practice primarily in that side-effects are represented as edges instead of vertices. This kind of flow-graph is not necessary for the invention, but simplifies minor details of its preferred embodiment.

FIG. 2 shows an example C program and the corresponding flow-graph. Notice that the test "if(x<y)" becomes three edges in the flow-graph: one for the evaluation the expression "x<y", and two more corresponding to taking the "true" and "false" arms of the if-then-else. Also notice that not only are there edges for assignment expressions, but also edges for the creation and destruction of variable z.

Figure 3:
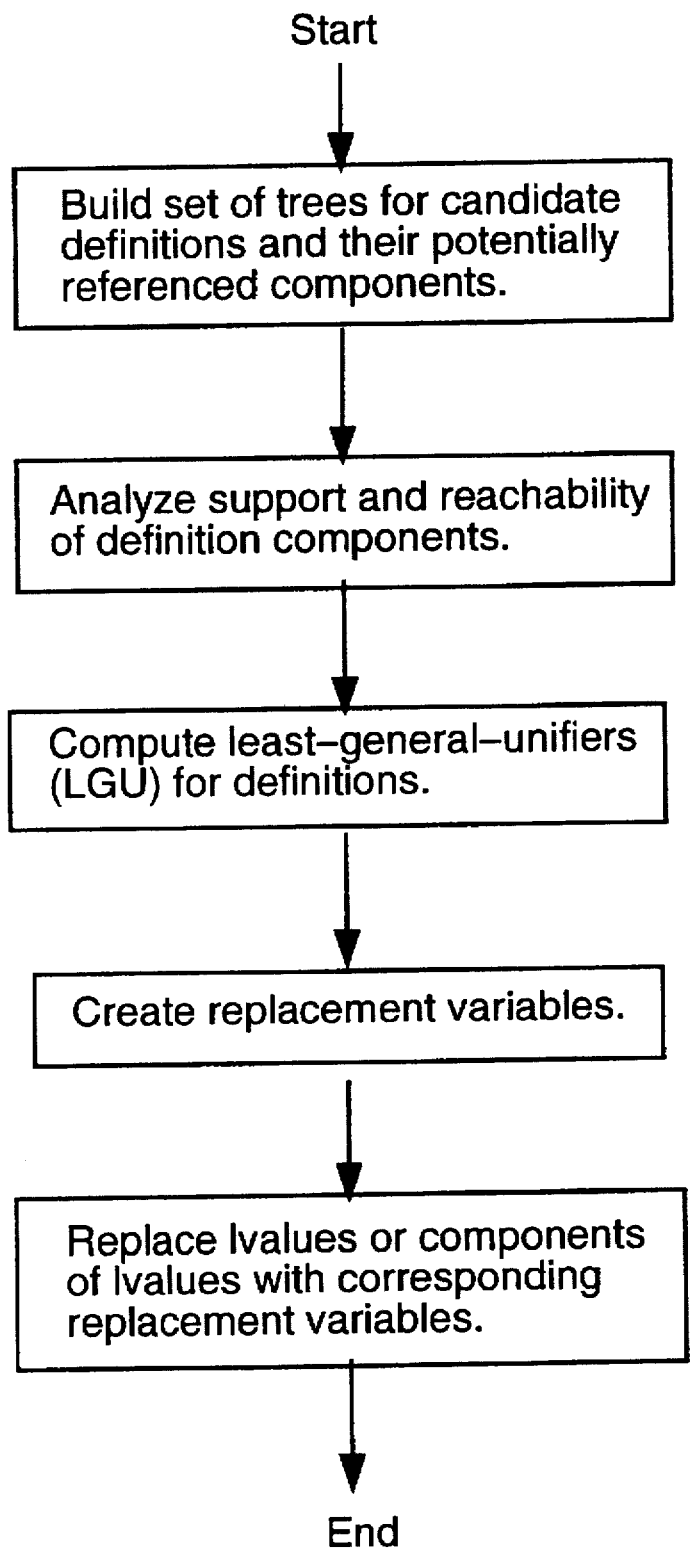
FIG. 3 is a high-level flow chart of the present invention.

FIG. 3 shows an overview of the steps applied by the invention to a program and its associated flow-graph. The application of all these steps is considered a single "pass" of the invention. These steps are as follows.

1. Find all candidate definitions. These are assignments or initializations of lvalues. The candidate definition may contain side-effects other than the assignment or initialization itself.

2. Build the region-forest CANDIDATE_REGION_FOREST for the candidates. Begin by setting CANDIDATE_REGION_FOREST to empty. Each candidate is of the form L:=R, where the left-hand side L is an lvalued-expression and the right-hand side R. is an rvalued-expression. Add a node corresponding to L to the CANDIDATE_REGION_FOREST. Add any extra nodes that are necessary to connect the new node to the root of a region-tree. This may require adding a new root node to CANDIDATE_REGION_FOREST.

3. Refine the region-forest CANDIDATE_REGION_FOREST to the granularity of the smallest components of definitions that are potentially used. This step proceeds by scanning the program for loads and/or stores of components whose outermost containing lvalue is already represented in CANDIDATE_REGION_FOREST. If the tree does not yet have a node corresponding to the loaded/stored lvalue, a node is added to the tree. Adding the node requires adding intermediate nodes to connect it with the rest of the tree when the node is not a child of an existing node. The components of each lvalue L that correspond to the leaves in the final tree are called the "leaf-components" of L.

4. Construct and solve IS_SAME problems for left-hand-sides of candidates. An IS_SAME problem is the following question.

Given an rvalued expression E, and two points x and y in the flow-graph, if expression E is evaluated at point y, does it yield the same rvalue as evaluation of the expression at the most recent encounter of point x would have yielded? If x and y are identical, then "most recent encounter of point x" is taken to mean the previous encounter.

An answer to the IS_SAME problem is denoted IS_SAME (E,x)(y), where IS_SAME(E,x)(y) returns a boolean value TRUE or FALSE. If E is the address of an lvalue expression L, then if IS_SAME(E,x)(y)=FALSE, the support of L is said to have "collapsed". To solve the IS_SAME problems, apply any kind of data-flow solver. The method of solving the IS_SAME problems is not part of the present invention; only the application of the solution of the IS_SAME problems is part of the invention.

5. Construct and solve the REACHES problems. Construct the REACHES problems as follows. For each definition D (of the form L:=R), there are one or more REACHES problems. There is one problem for each leaf in the tree REGION_CANDIDATE_SET that corresponds to a component or sub-component of L. Let L.c denote a component or sub-component of L, where L is the left-hand-side of a definition. A REACHES problem is the question:

Let vertex h be the head of the edge corresponding to definition D. When vertex y is encountered, does the lvalue assigned to L.c by the most recent encounter of vertex h ever reach vertex y (even if the support of L changes)?

The answer to a REACHES problem is denoted REACHES(D,c)(y), where REACHES(D,c)(y) returns a boolean value TRUE or FALSE. If REACHES(D,c)(y)= TRUE, the definition of D.c is said to "reach" vertex y. The answer to a REACHES problem is independent of the IS_SAME problem for the left-hand-side. That is, if a value is assigned to L.c and the support of L collapses before vertex y is encountered, but the value assigned to the original L.c is still there when vertex y is encountered, then REACHES(D,c)(y)=TRUE nonetheless. To solve the REACHES problems, apply any kind of data-flow solver. The method of solving the REACHES problems is not part of the present invention; only the application of the solution of the REACHES problems is part of the invention.

6. Find least-general unifiers for the definitions.

(a) Set initial LGUs as follows. For each component c of each definition D, set GROUP(D.c):=D.c. That is, the initial group for a component of the left-hand-side is the component itself. Set LGU(GROUP(D.c)):=NODE (D.c). Set IS_LIVE(GROUP(D.c)):=false. Set REPLACEMENT(GROUP(D.c)):=NONE.

Figure 4:
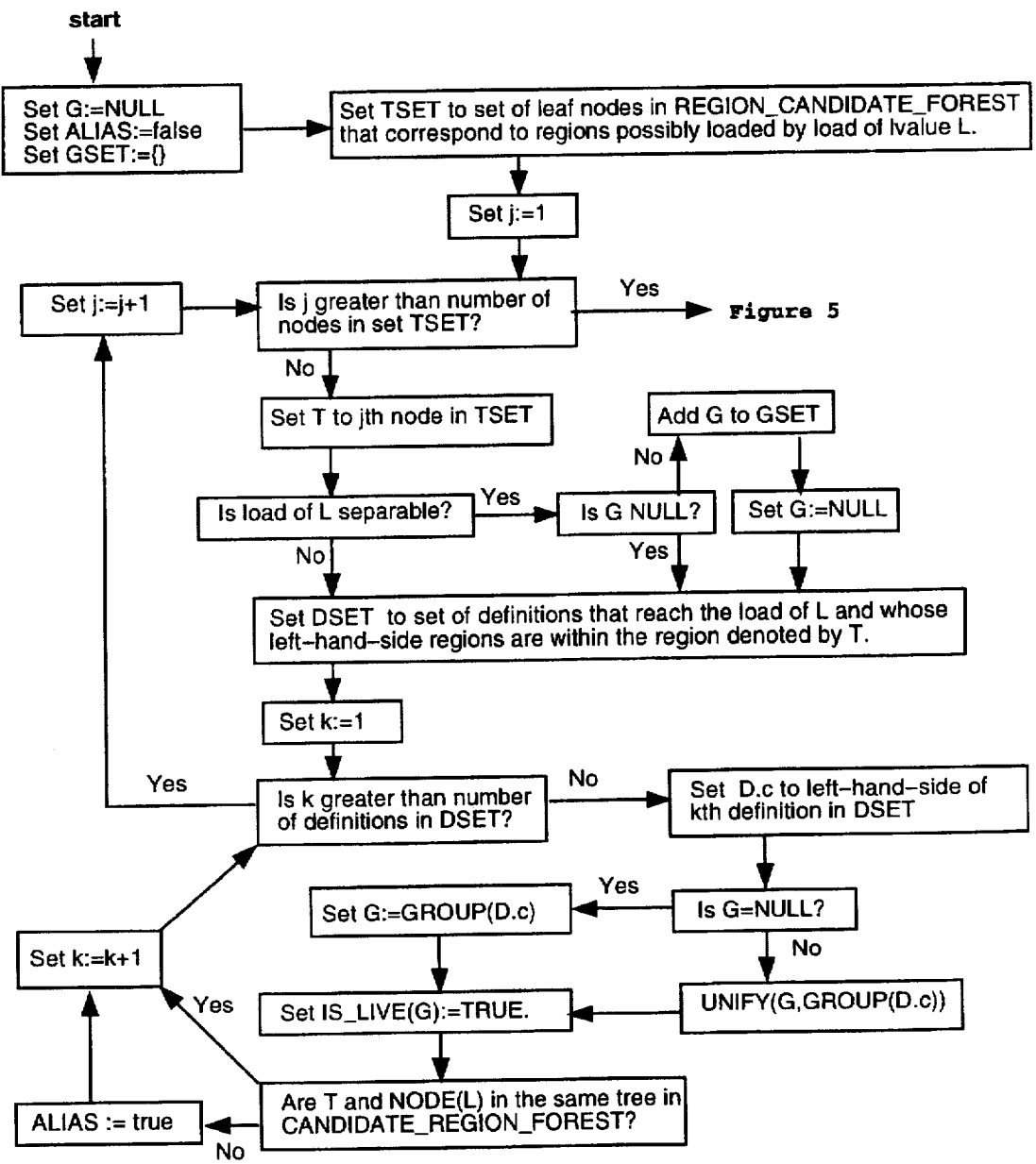
FIGS. 4 and 5 comprise a detailed flow chart of the herein disclosed process for computing the effect of a load from memory.
Figure 5:
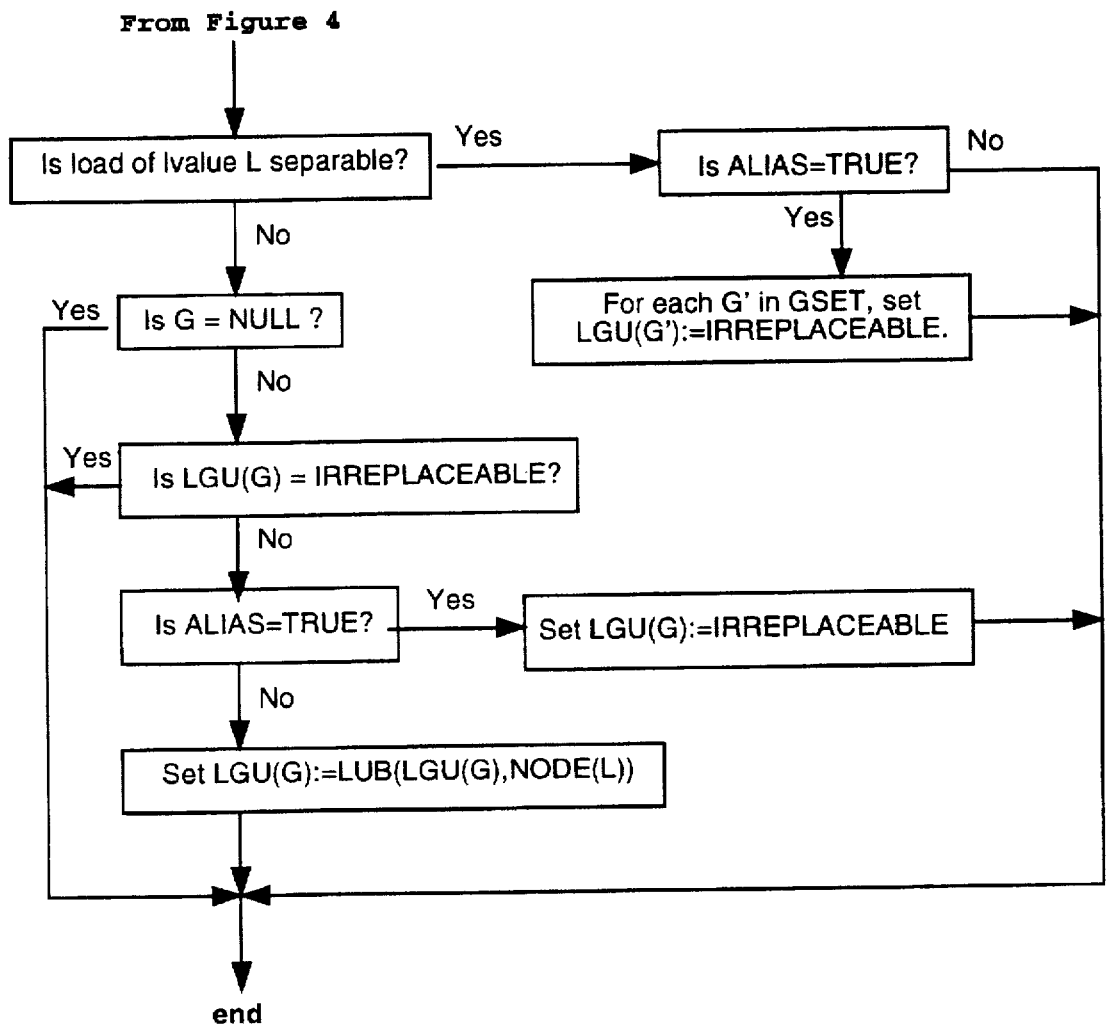
Figure 6:
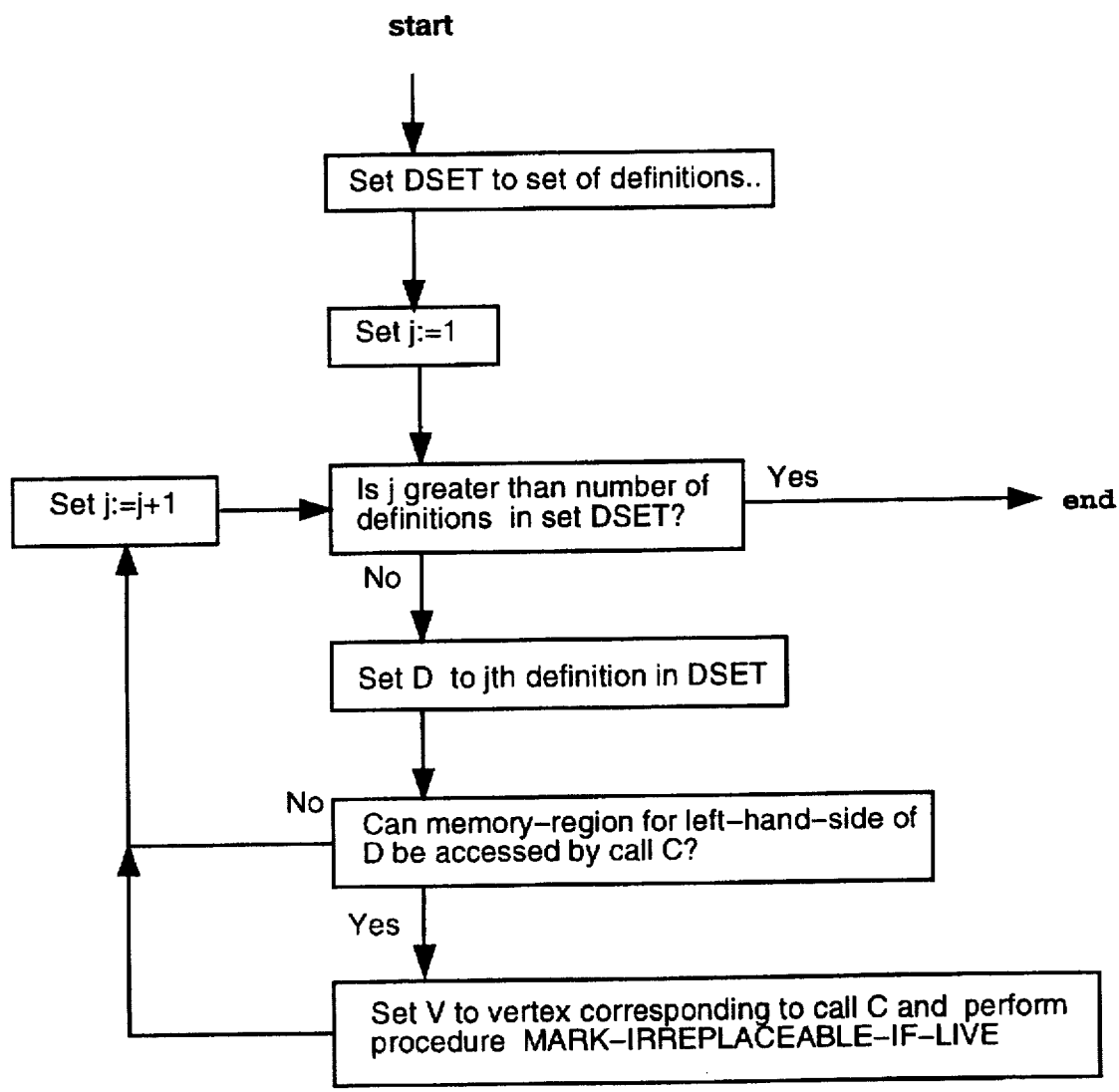
FIG. 6 is a detailed flow chart of the herein disclosed process for computing the effect of a subroutine-call.

(b) Consider each load or call in the program. For each call C, do step (c). For each load of an lvalue L, do steps (d)–(e). Steps (d)–(e) are shown in FIGS. 4 and 5.

c) Update the LGUs to reflect the possible effects of the call as shown in FIG. 6. Select all components D.c of definitions that reach the point of call and might be modified by the call. For each such component D.c, set LGU(GROUP(D.c)):=IRREPLACEABLE and set IS_LIVE(GROUP(D.c)):=TRUE. The method of determining which components might be modified by a call is not part of the invention. Only the aforementioned analysis of such components is part of the invention.

(d) Consider the set of candidate definitions that reach the lead of lvalue L. If any definition reaches via an alias, or if the lead U possibly uses a value that is not from a candidate definition, then set its LGU to IRREPLACEABLE. Set LIVE(LGU(D.c)):=TRUE for all reaching components.

Figure 7:
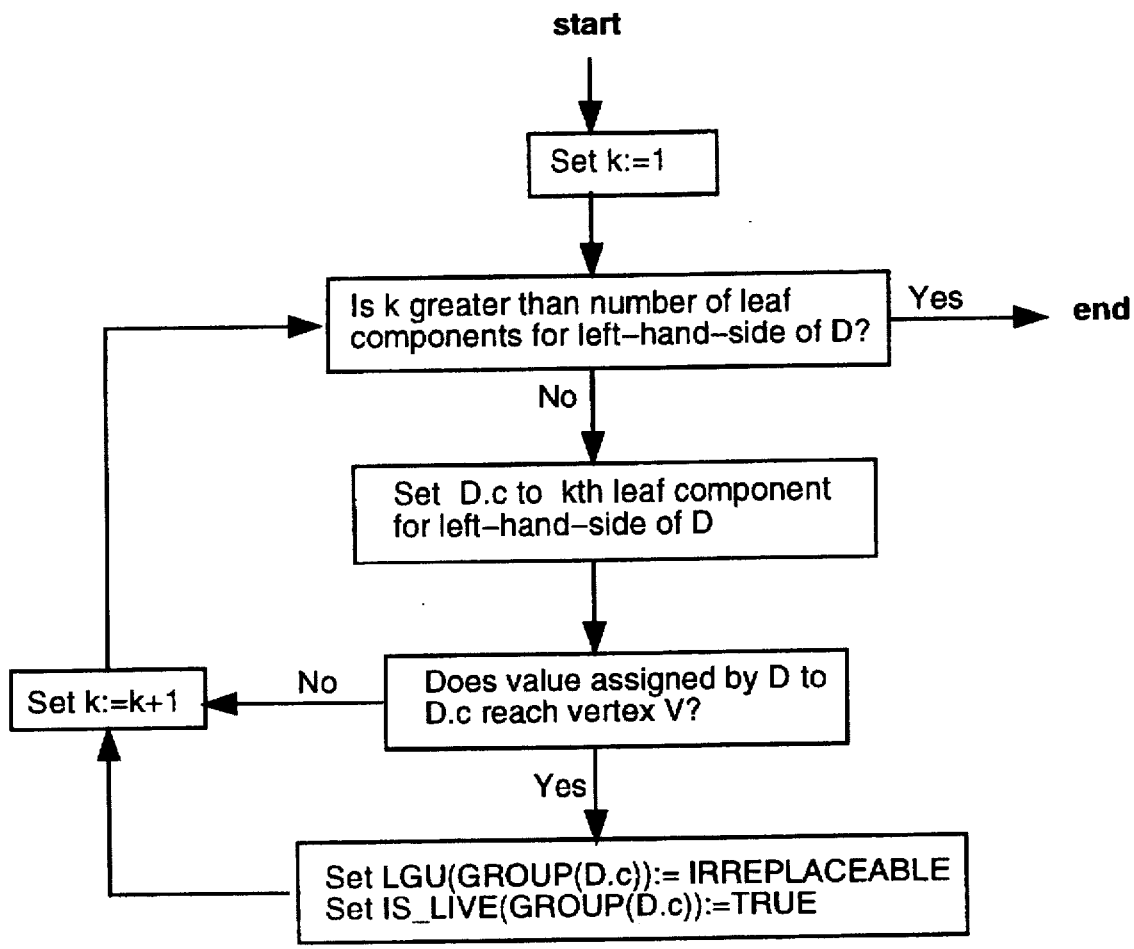
FIG. 7 is a detailed flow chart for the process MARK-IRREPLACEABLE-IF-LIVE that is part of the present invention.
Figure 8:
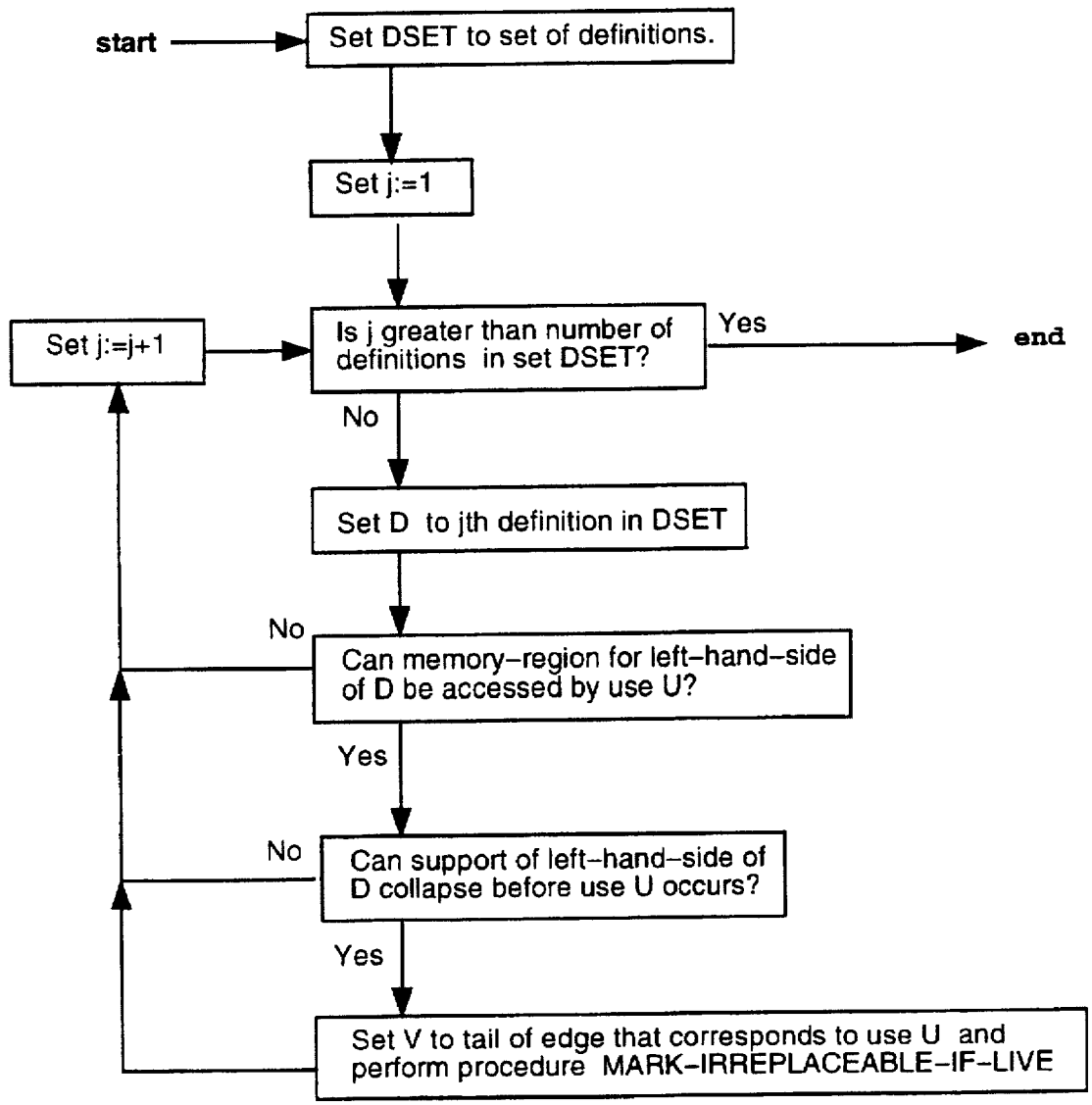
FIG. 8 is a detailed flow chart of the herein disclosed process for handling cases where the support of a definition collapses.

(e) As shown in FIG. 8, inspect each definition D for the following two conditions:
  (i) The definition modifies a memory-region that may be loaded by a lead of lvalue L.
  (ii) The support of the definition may collapse before a lead of lvalue L is executed. If both conditions hold, then apply process MARK-IRREPLACEABLE-IF-LIVE to mark all components D.c that reach the lead of L as irreplaceable. Process MARK-IRREPLACEABLE-IF-LIVE is shown in FIG. 7.

7. Account for lvalues that are stored into before ("live-in") or loaded after ("live-out") the program is executed. Such lvalues cannot be replaced. For each definition component D.c that is live-in or liveout, set LGU(GROUP(D.c)):= IRREPLACEABLE. If the definition component D.c is live-in, set IS_LIVE(GROUP(D.c)):=TRUE.

Figure 9:
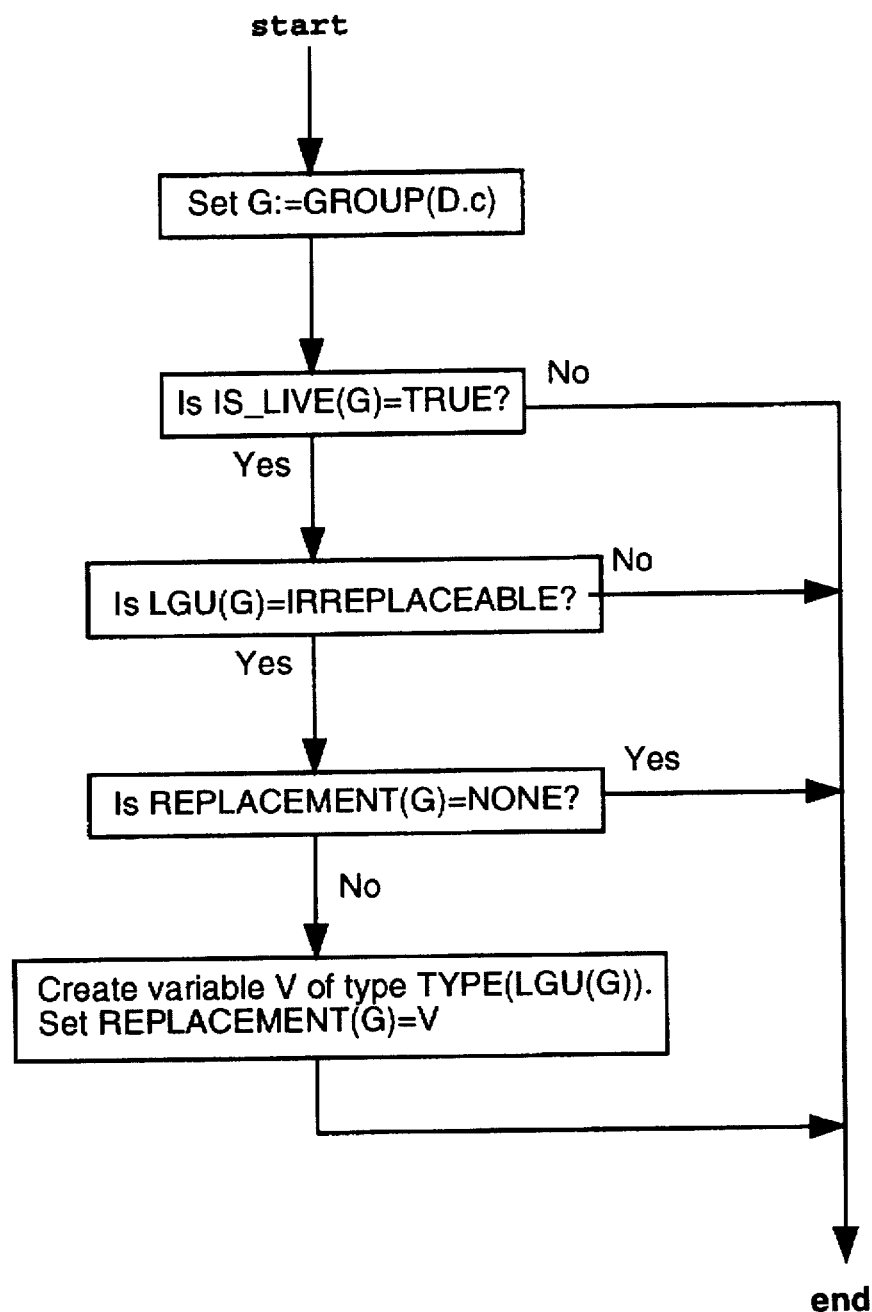
FIG. 9 is a detailed flow chart of the replacement-variable-creation process in FIG. [3].

8. Create replacement variables. Note that up to this step, REPLACEMENT(G)=NONE for any group G. For each component D.c of each definition D, apply the following steps as shown in FIG. 9. Let G=GROUP(D.c). If IS_LIVE(G)=TRUE and LGU(G) is not IRREPLACE-ABLE and REPLACEMENT(G)=NONE, then create a new variable V of type TYPE(LGU(G)) and set REPLACEMENT(G)=V.

Figure 10:
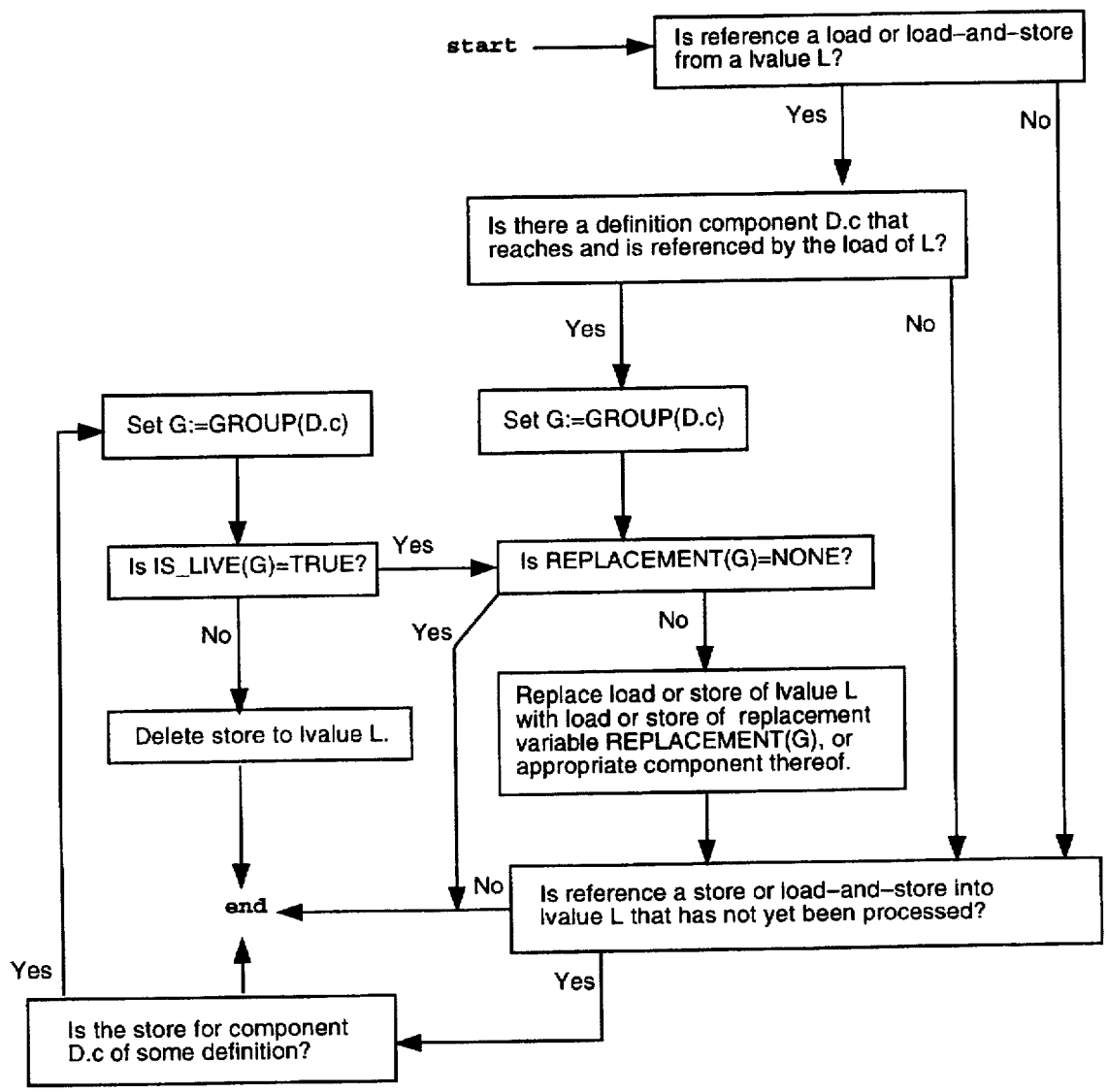
FIG. 10 is a detailed flow chart of the replacement process in FIG. [3].

9. Traverse the program, looking for references (loads and/or stores) to lvalues that are represented in REGION_CANDIDATE_TREE. Each reference may be a lead, store, or both (load-and-store). An example of a reference that is both a lead and a store is the reference to "i" in the C-language expression "++i". When replacing the lead within a load-and-store reference, the invention is careful to retain the original store, and vice versa. For example, when replacing the lead in "++i" by "j", the resulting expression is "i=j+1", not simply "++j". For each such reference that is a load, store, or load-and-store of an lvalue L, perform the following steps, as shown in FIG. 10:

(a) If lvalue L is separable and there exist two components L.c1 and L.c2 of lvalue L such that GROUP(L.c1) and GROUP(L.c2) differ, then rewrite the reference as references to the separate components and perform steps (b)–(k) for each separate reference. Otherwise perform steps (b)–(k) for the whole load reference to lvalue L.

(b) If the reference is a load from L (or a load-and-store), go to step (c). Otherwise continue to step (g).

(c) If there is a definition component D.c that reaches the load of lvalue L and is referenced by the load of L, then go to step d; otherwise go to step g.

(d) Set G:=GROUP(D.c)

(e) If REPLACEMENT(G)=NONE, then consider the reference no further. Otherwise go to step f.

(f) Replace the reference to L by a reference to the replacement variable REPLACEMENT(G) or appropriate subregion thereof. Both cases can be handled by replacing the reference to lvalue L by MAKE_SUBREGION(LGU(G),NODE(L),REPLACEMENT (G)). Continue to step g.

(g) If the reference is a store (or load-and-store) into lvalue L, and has not yet been processed by steps (h)–(k), go to step (h). Otherwise consider the reference no further.

(h) If the store into L is a store that corresponds to a store into a component D.c executed by a definition D, then go to step (i); otherwise consider the reference no further.

(i) Set G:=GROUP(D.c).

(j) If IS_LIVE(G) is TRUE, go to step (g). Otherwise, continue to step (k).

(k) The store is not used and should be deleted from the program. Delete the store and consider the reference no further.

It is emphasized that the particular methods for solving the data-flow problems in steps 4 and 5 are not part of the invention, and those skilled in the art will recognize that a variety of methods can be applied to the solution of the aforementioned data-flow problems. The invention concerns only the proposition of the problems and the application of their solution.

Applying multiple passes of the invention to analyze and transform again may yield results superior to a single pass in cases where replacement of lvalues by variables improves the accuracy of alias-analysis and data-flow analysis. Best results are obtained by iteratively applying passes until no non-trivial replacements occur. A replacement is trivial if it is the replacement of all definitions and uses of an lvalue by a single variable.

The following modification allows more replacements to be made. Omit step 7 from the process described above. Instead, after step 9, perform the following step to compensate for the omission of step 7:

10. For each replaced lvalue that was live-in, insert extra compensating assignments at the beginning of the program being optimized that assign the live-in value to the replacement variable. For each such replaced lvalue that was live-out, insert extra compensating assignments at the end of the program being optimized that assign the replacement variable's value to the value.

The following additional modification to the present invention allows more replacements to be made in the presence of loops. The modification is to omit step 7 and include step 10, and analyze each loop (or nest of loops) separately. Doing so sometimes allows further replacements of lvalues inside a loop,when replacement of the lvalue would otherwise be prohibited by conditions outside of the loop.

I explain below the deficiencies of prior art and why the present invention is superior.

The prior art of Cytron et al for scalar renaming merely replaces scalar variables with other scalar variables. Its restriction to variables essentially means that it considers only lvalues whose support is empty, and thus the answers to the IS_SAME problems would be trivially TRUE. Its restriction to scalars essentially means that it considers only lvalues whose corresponding region-tree would consist of a single trivial root node. In contrast, the present invention replaces arbitrary lvalues, which may be components of aggregates, and/or referenced by arbitrary expressions, and (possibly) may have aliases.

The prior art of Budge et al does not use data-flow analysis. It cannot do any replacement if a structure has its address taken. In contrast, the present invention can replace structures whose address is taken, when the taking of the address is irrelevant to an opportune replacement. For example, consider the following C++ program fragment.

```
struct Complex {
    float re, im;
}
Complex a;
capture_address(&a);          // Capture address of "a"
for( int i=0; i<10; i++ ) {
    a.re = a.re+3.0;          // Def. 1.
    a.im = a.im+4.0;          // Def. 2.
    a.re = 2.0*a.re;          // Def. 3.
    a.im = 2.0*a.im;          // Def. 4.
}
use_address();                // Use captured address
```

The prior art of Budge et al can do no replacement, because the address of structure "a" has been captured by function "capture", thus allowing structure "a" to be accessed by other functions. However, the present invention can apply replacement to definitions (1) and (2), because it performs data-flow analysis to prove that the address of "a" cannot be used when these definitions are live. Applying the present invention to the example above yields the code below, in which replacement variables "temp1" and "temp2" have been introduced.

```
struct Complex {
    float re, im;
}
Complex a;
float temp1, temp2;
capture_address(&a);
for( int i=0; i<10; i++) {
    temp1 = a.re + 3.0;
    temp2 = a.im + 4.0;
    a.re 2.0*temp1;
    a.im = 2.0*temp2;
}
use_address();
```

Furthermore, the prior art of Budge et al considers only lvalues that are local variables. The present invention considers lvalues that are not necessarily local variables, and performs scalar-replacement where applicable. For example, consider the following fragment.

```
struct Complex {
    float re, im;
}
Complex z;
Complex * p = some_address();  // Set p to address of a Complex object.
(*p).re = 5;                   // Set "re" component to 5.
z = ((*p).re);                 // Use "re" component
(*p).re = 10;                  // Reset "re" component to 10.
```

Notice that the address returned by function some_address could have an alias; that is, some other pointer-variable could contain the same address. Such an alias would not prevent the present invention from doing the replacement shown above.

The prior art of Budge et al can do nothing with this example. In contrast, the present invention replaces the first set of references to the lvalue (*p).re by a scalar variable (named "temp" in the example). The present invention succeeds because it performs data-flow analysis and recognizes that the definition "(*p).re=5" is used only by the assignment to z.

```
struct Complex {
    float re, im;
}
Complex * p = some_address();
Complex temp = 5;
z = temp;
(*p).re = 10;
```

Furthermore, the prior art of Budge et al. and Cytron et al. do not work with unions. The present invention replaces references to fields of unions by scalar variables where possible. In this respect the present invention is limited only by how well the REACHES problem is solved for unions. For example, consider the following fragment.

```
union Cell {              // Storage for re, i, and car overlap.
    float re;
    int i;
    struct {
        Cell * car;
        Cell * cdr;
    } cons;
};
Cell a, b;
b.car = &a;               // Definition #1
use(b.car)
b.re = 3.14;              // Definition #2
```

If the solver of the REACHES problem is capable of indicating that definition #1 does not reach past definition #2, then the present invention determines that the LGU for b.car in the first definition is replaceable and transforms the example into the code below.

```
union Cell {
    float re;
    int i;
    struct {
        Cell * car;
        Cell * cdr;
    } cons;
};
Cell a, b;
Cell * temp = &a;         // Definition #1
use(temp)
b.re = 3.14;              // Definition #2
```

Furthermore, the prior art of Budge et al. unnecessarily breaks structure assignments up into scalars in cases where the present invention does not. For instance, consider the following example in which some components are never used.

```
struct Pair {
    struct Hairy {
        float a, b, c, d, e, f, g, h;
    } x, y;
} r, s, t;
r.x = some_value();       // Set r.x
s.x = r.x
t.x = s.x;
use( t.x );               // Use the value of t.x
```

The prior art of Budge et al., before attempting replacement, breaks the structure assignments "s.x=r.x" and "t.x=s.x" into multiple scalar assignments before replacement, and thus would yield code similar to that shown below, with separate temporaries u0 . . . u7 for each scalar component of "s.x".

```
r.x = some_value();       // Set r.x
u0 = r.x.a;
u1 = r.x.b;
u2 = r.x.c;
u3 = r.x.d;
u4 = r.x.e;
u5 = r.x.f;
u6 = r.x.g;
u7 = r.x.h;
t.x.a = u0;
t.x.b = u1;
t.x.c = u2;
t.x.d = u3;
t.x.e = u4;
t.x.f = u5;
t.x.g = u6;
t.x.h = u7;
use( t.x );               // Use the value of t.x
```

In contrast, the present invention, by analyzing least-general-unifiers, determines that s.x need not be decomposed, and transforms the example into the simpler code shown below.

```
r.x = some_value();       // Set r.x
u = r.x
t.x = u;
use( t.x );               // Use the value of t.x
```

There are two benefits of avoiding unnecessary decomposition of structures (and, more generally, other kinds of aggregates). First, it makes analysis faster because there are fewer components to analysis individually. Second, the resulting machine code can become bloated when all structure assignments are converted into series of scalar assignments.

Finally, another benefit of the present invention is that it does not spend machine resources analyzing components of structures that are implicitly present but not used. For instance, consider the following example.

float A[1000];

A[42]=x;

y=A[42];

Only the component A[42] of the array A is explicitly referenced. When the invention analyzes the example, the region-forest CANDIDATE_REGION_FOREST will contain a node corresponding to A[42], but will not contain nodes for the other 999 elements of A. Consequently, the invention can replace the references to A[42] by a scalar variable, without wasting time and space by individually analyzing the 999 implicit components of A.

What I claim is:

1. A method operable within an optimizing compiler that during compilation replaces references to general lvalues with variables, the method comprising the steps of:

(a) performing data-flow analysis that analyzes the support and reachability of definition components;

(b) calculating least-general-unifiers for definitions based on said data-flow analysis;

(c) creating replacement variables corresponding to said least-general-unifiers that are replaceable; and (d) replacing loads and stores of said lvalues with loads and stores of said replacement variables.

2. A method operable within an optimizing compiler as set forth in claim 1, including the calculation of least-general-unifiers for groups of definitions, comprising the steps of:

(a) setting the initial group for each component of a definition to a singleton group containing only the component itself;

(b) applying the flow-analysis to determine when groups must be merged, (c) computing the least-general-unifiers of the merged groups.

3. A method operable within an optimizing compiler as set forth in claim 2, where least-general-unifiers are represented as pointers to nodes in a region-forest, or a special pointer that points to no node.

4. A method operable within an optimizing compiler as set forth in claim 1, in which aggregates are analyzed at the granularity of their referenced components, instead of at their smallest possible components.

5. A method operable within an optimizing compiler as set forth in claim 1, including the replacement of each non-scalar lvalue by a non-scalar variable when the least-general-unifier corresponds to a non-scalar lvalue, instead of replacing the smallest possible components of the lvalue.

6. A method operable within an optimizing compiler as set forth in claim 1, further comprising the steps of:

(a) generating replacements for only those groups marked as live;

(b) deleting stores to lvalues whose corresponding group is not marked live.

7. A method operable within an optimizing compiler as set forth in claim 1, including replacement of lvalues that may have aliases and/or their address taken.

8. A method operable within an optimizing compiler as set forth in claim 1, including replacement of components of aggregates that contain overlapping members ("unions").

9. A method operable within an optimizing compiler as set forth in claim 1, in which only those components of aggregates that are explicitly referenced must be analyzed.

10. A method operable within an optimizing compiler as set forth in claim 1 in which live-in and live-out lvalues are replaced without regard to effects outside the loop or procedure being analyzed, and compensating assignments are inserted to account for live-in and/or live-out properties.

* * * * *